(12) United States Patent
Kruse et al.

(10) Patent No.: US 12,722,720 B2
(45) Date of Patent: Sep. 1, 2026

(54) WIND NOISE REDUCTION GARNISH

(71) Applicant: Honda Motor Co., Ltd., Tokyo (JP)

(72) Inventors: Patrick W. Kruse, Marysville, OH (US); Jeffrey D. Wheeland, Radnor, OH (US); David J. Rose, West Mansfield, OH (US); Hirofumi Takemoto, Dublin, OH (US); Liza G. Bare, Powell, OH (US); Austin Kimbrell, Powell, OH (US); Nigel Williams, Raymond, OH (US)

(73) Assignee: Honda Motor Co., Ltd., Tokyo (JP)

( * ) Notice: Subject to any disclaimer, the term of this patent is extended or adjusted under 35 U.S.C. 154(b) by 299 days.

(21) Appl. No.: 18/581,706

(22) Filed: Feb. 20, 2024

(65) Prior Publication Data

US 2025/0263138 A1 Aug. 21, 2025

(51) Int. Cl.
*B62D 35/00* (2006.01)
*B60R 13/04* (2006.01)
*B62D 25/04* (2006.01)

(52) U.S. Cl.
CPC ............ *B62D 35/008* (2013.01); *B60R 13/04* (2013.01); *B62D 25/04* (2013.01); *B62D 35/007* (2013.01)

(58) Field of Classification Search
CPC .. B62D 35/008; B62D 25/804; B62D 35/007; B62D 35/005; B60R 13/04
USPC ................................ 296/193.06, 180.1, 1.08
See application file for complete search history.

(56) References Cited

U.S. PATENT DOCUMENTS

| | | | |
|---|---|---|---|
| 7,111,898 B2 | 9/2006 | Rinklin | |
| 7,780,190 B2 | 8/2010 | Yamagiwa et al. | |
| 8,360,493 B2 | 1/2013 | Gerndorf et al. | |
| 12,589,702 B2 * | 3/2026 | Kaltenmark | B60R 13/025 |
| 2017/0002904 A1 | 1/2017 | Behle | |
| 2018/0326830 A1 * | 11/2018 | Farmer | B60J 10/86 |
| 2023/0159114 A1 | 5/2023 | Metka et al. | |
| 2025/0229732 A1 * | 7/2025 | Kruse | B60R 13/04 |

FOREIGN PATENT DOCUMENTS

| | | |
|---|---|---|
| CN | 206012299 U | 3/2017 |
| CN | 214084458 U | 8/2021 |
| JP | 2005247124 A | 9/2005 |
| JP | 2008087544 A | 4/2008 |
| JP | 5417004 B2 | 2/2014 |

(Continued)

*Primary Examiner* — Roger L Pang
(74) *Attorney, Agent, or Firm* — Plumsea Law Group, LLC

(57) ABSTRACT

A vehicle comprising having a vehicle body including a lower side, a rear quarter window and a rear spoiler garnish, the vehicle defining an inner passenger compartment; a D-pillar garnish configured to be mounted on the vehicle body between the rear spoiler garnish and the lower side of the vehicle, the D-pillar garnish including an outer garnish body having a first predetermined curvature portion; and an inner garnish body. The rear spoiler garnish includes an outer rear spoiler garnish and an inner rear spoiler garnish, the inner rear spoiler garnish having a second predetermined curvature portion. A gap is defined between a rear edge of the outer garnish body and a lower edge of the rear spoiler garnish, and the first predetermined curvature portion and the second predetermined curvature portion defining a convoluted flow path through the gap.

14 Claims, 5 Drawing Sheets

(56) References Cited

FOREIGN PATENT DOCUMENTS

| | | | |
|---|---|---|---|
| JP | 6065867 | B2 | 1/2017 |
| JP | 6831168 | B2 | 2/2021 |
| JP | 7125665 | B2 | 8/2022 |
| WO | 2015135661 | A1 | 9/2015 |

* cited by examiner

WIND NOISE REDUCTION GARNISH

BACKGROUND

1. Field of the Disclosure

The present disclosure relates to a vehicle garnish assembly and, more particularly, to a garnish panel assembly creating a labyrinth path adjacent a rear spoiler.

2. Description of Related Art

Many automobiles and other motorized vehicles include panels that enhance the appearance and/or functionality of the vehicle body. These panels are referred to as garnish panels or simply a "garnish." Garnish panels are often placed at the edges of body panels, for example adjacent spoilers or openings. High-speed air flowing over a small gap between the spoiler and the garnish may cause air from the open cavity behind the garnish to vent through the small gap due to a negative pressure differential created between the stagnant air behind the garnish and the high-speed air on the outside of the garnish. This venting effect may create a wind noise that can cause a disturbance to passengers within the cabin.

There is a need in the art for an improved garnish assembly to minimize any wind noise and thus reduce the passenger disturbance.

SUMMARY OF THE INVENTION

The disclosure herein is directed to a vehicle garnish assembly configured to reduce wind noise. The disclosed garnish assembly achieves this reduction of the wind noise due to a combination of 1) a chamfer feature that impedes the air within the open cavity behind the garnish from venting through the small gap and 2) the D-pillar and rear spoiler garnish panels defining a curvy, labyrinth flow path so as to slow the high-speed air as it flows over the small gap. These features in combination greatly reduce the speed of air through the gap to thereby eliminate or significantly reduce wind noise produced during vehicle travel.

In one aspect, the disclosure provides a vehicle comprising a vehicle body including a lower side, a rear quarter window and a rear spoiler garnish, the vehicle defining an inner passenger compartment. A D-pillar garnish is configured to be mounted on the vehicle body between the rear spoiler garnish and the lower side of the vehicle, the D-pillar garnish including an outer garnish body having a first predetermined curvature portion and an inner garnish body. The rear spoiler garnish includes an outer rear spoiler garnish and an inner rear spoiler garnish, the inner rear spoiler garnish having a second predetermined curvature portion. A gap is defined between a rear edge of the outer garnish body and a lower edge of the rear spoiler garnish. The first predetermined curvature portion and the second predetermined curvature portion define a convoluted flow path through the gap.

In a further aspect, a garnish panel for a vehicle comprises an outer garnish body having a main body portion, a middle leg portion and a terminal end portion; and an inner garnish body disposed adjacent the outer garnish body, the inner garnish body having a main body portion, a first leg portion, a second leg portion and a terminal end portion. The middle leg portion of the outer garnish body includes a curved portion having a first predetermined curvature and the first leg portion of the inner garnish body includes a curved portion having a second predetermined curvature complimentary to the first predetermined curvature of the middle leg portion such that middle leg portion of the outer garnish body nests within the first leg portion of the inner garnish body.

A garnish assembly for a vehicle is also provided in another aspect of the disclosure, the vehicle including a lower side, a rear quarter panel window, and a rear hatch, and the vehicle defining an inner passenger compartment, The garnish assembly comprises a rear spoiler garnish configured to be mounted on the vehicle above the rear hatch, the rear spoiler garnish including an outer rear spoiler garnish and an inner rear spoiler garnish; and a D-pillar garnish configured to be mounted on the vehicle between the rear spoiler garnish and the lower side of the vehicle, the D-pillar garnish including an outer garnish body and an inner garnish body. A gap is defined between the rear spoiler garnish and the D-pillar garnish and the rear spoiler garnish and the D-pillar garnish define a flow path through the gap including at least one curved section.

Other systems, methods, features and advantages of the disclosure will be, or will become, apparent to one of ordinary skill in the art upon examination of the following figures and detailed description. It is intended that all such additional systems, methods, features and advantages be included within this description and this summary, be within the scope of the disclosure, and be protected by the following claims.

BRIEF DESCRIPTION OF THE DRAWINGS

The disclosure can be better understood with reference to the following drawings and description. The components in the figures are not necessarily to scale, emphasis instead being placed upon illustrating the principles of the disclosure. Moreover, in the figures, like reference numerals designate corresponding parts throughout the different views.

DETAILED DESCRIPTION

The disclosure herein is directed to a vehicle including a vehicle body defining a structural periphery of the vehicle. As shown in the accompanying figures and discussed in greater detail below, the vehicle includes a garnish panel configured to be mounted on the vehicle body. The garnish panel may be configured to be mounted on any suitable portion of the vehicle body. In some exemplary embodiments, the garnish arrangement is configured to be mounted in a D-pillar region of the vehicle body. The D-pillar region of a vehicle is a known region of a vehicle body defining the rear most vertical roof support structure or "pillar" that generally extends between a rear quarter panel window and a tailgate of a four-door vehicle with a rear hatch. Examples of such vehicles may include sport utility vehicles (SUV's), wagons, cross-overs, and other vehicles of similar constructions.

Figure 1A:
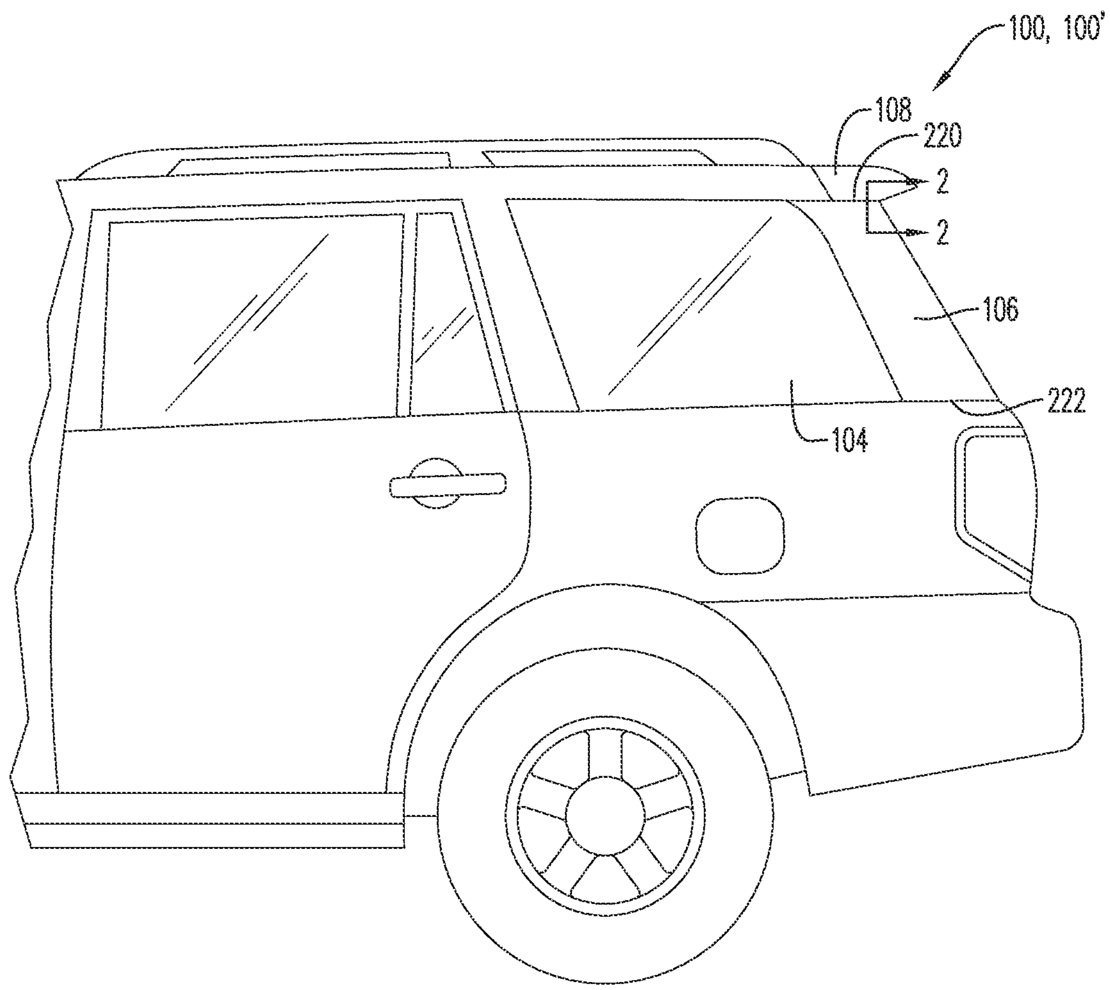
FIG. 1A is a schematic side view of a portion of a vehicle generally illustrating a D-pillar garnish and adjacent vehicle panels.
Figure 1B:
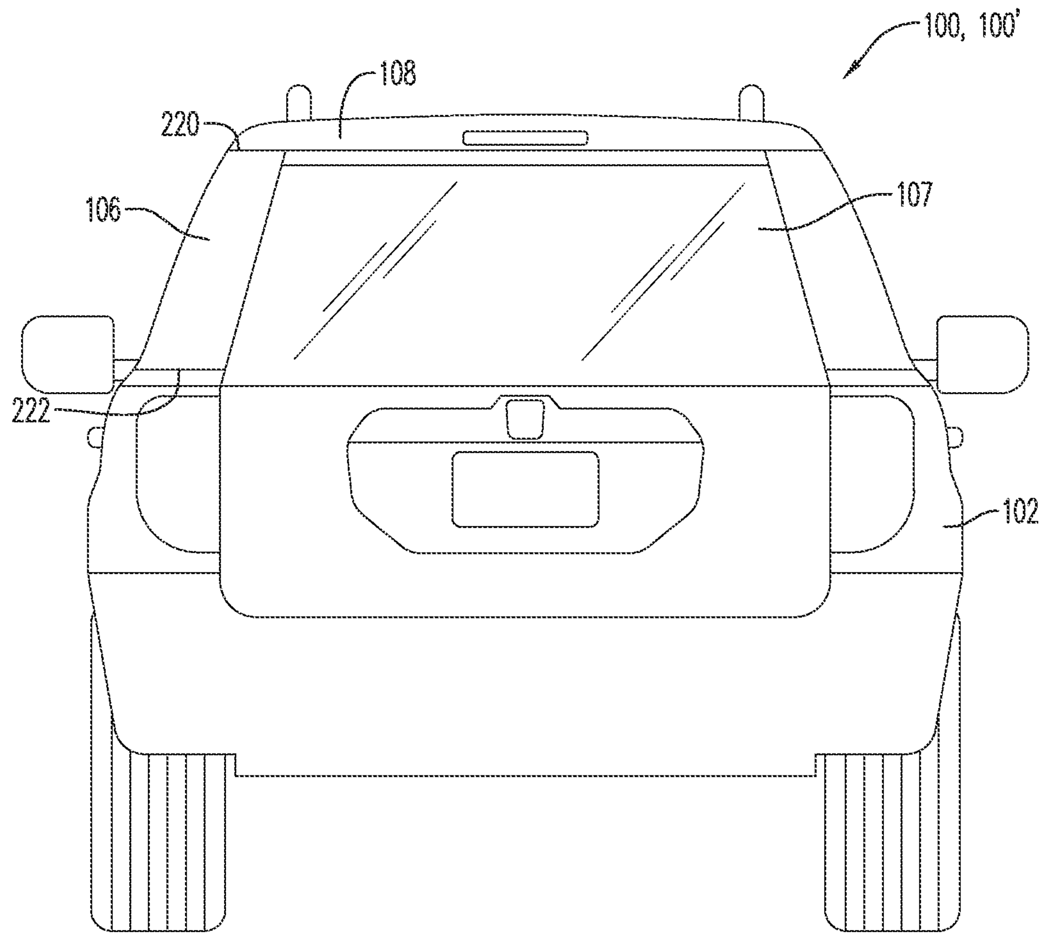
FIG. 1B is a schematic rear view of a vehicle generally illustrating the D-pillar garnish and rear spoiler garnish.

Referring to FIGS. 1A and 1B, a vehicle including a D-pillar garnish and a rear spoiler is shown generally by reference numeral 100. Vehicle 100 includes a lower side end 102, an opposing forward end (not shown), a rear quarter panel window 104, and an outer garnish panel 106 located proximate the rear quarter panel window 104 and a rear hatch 107 of vehicle 100. A rear spoiler garnish 108 is also shown above the rear hatch 107.

As illustrated in the cross sections of FIGS. 2A and 2B, the garnish panel 106 is disposed below the rear spoiler garnish 108 and, as known in the art, a small gap G is defined therebetween. The gap is generally on the order of 0.5 to 8 mm in width. On the exterior of the vehicle 100, an outer surface 108*a* of the rear spoiler garnish 108 is generally flush with an outer surface 106*a* of the garnish panel 106, as shown best in FIG. 2B. The interior passenger compartment 116 of the vehicle is located inward from an inner garnish panel 106*b*. The rear spoiler 108 also includes an inner rear spoiler garnish 108*b* disposed inward from the outer surface 108*a*.

Figure 2A:
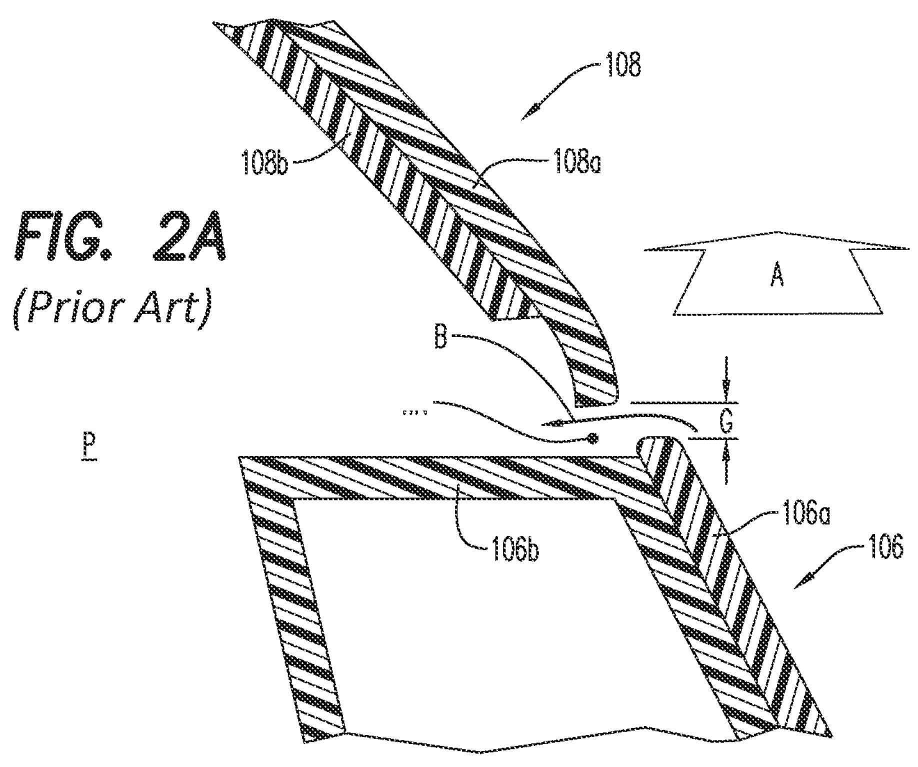
FIG. 2A is a schematic cross section taken generally along line 2-2 in FIG. 1 of a D-pillar garnish arrangement and an adjacent rear spoiler garnish, according to the prior art.

As illustrated in FIG. 2A, when the vehicle 100 is in motion, the wind or air will be travelling over the vehicle 100 in the direction of airflow arrow A. High-speed air flowing over the gap G between the rear spoiler 108 and the garnish panel 106 creates a negative pressure differential between the stagnant low pressure air behind the garnish panel 106 and the high-speed air flowing on the outside of the garnish panel 106 in the direction of arrow A. This causes the outside air to attempt to enter through the gap G, as shown by airflow arrow B, while air from within the passenger compartment 116 behind the garnish panel 106 is attempting to vent through the gap G. This turbulent flow of air may result in a wind noise area WN that is unpleasant for occupants of the vehicle.

Figure 3A:
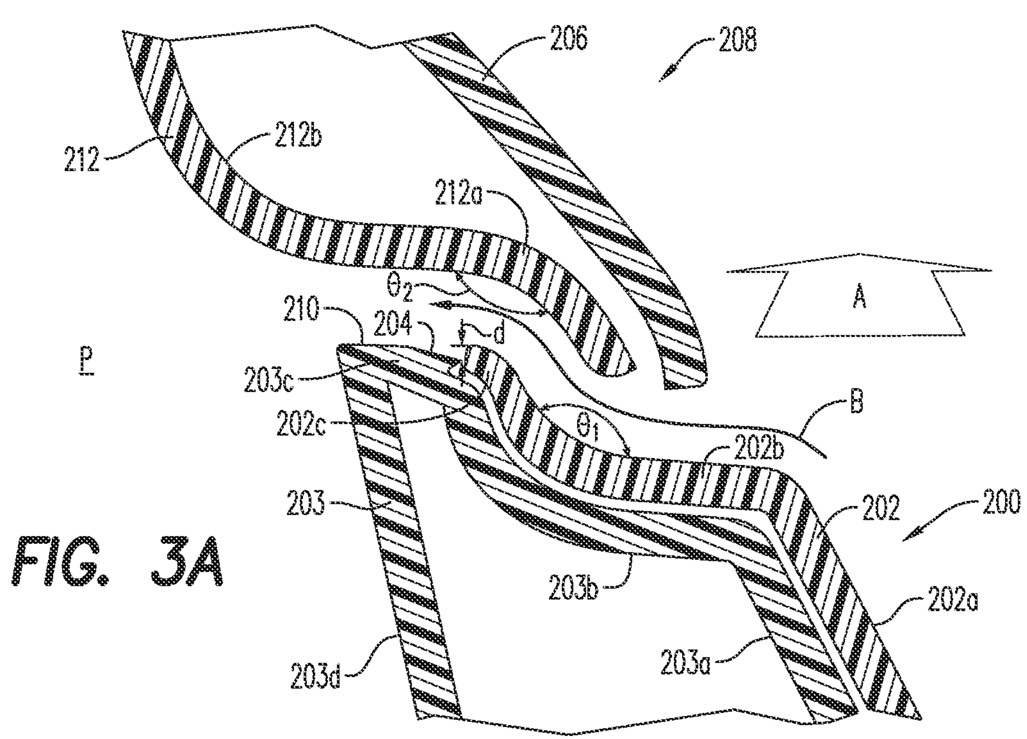
FIG. 3A is a schematic cross-section taken generally along line 2-2 in FIG. 1 of a garnish assembly and an adjacent rear spoiler garnish according to an exemplary embodiment of the disclosure.
Figure 4:
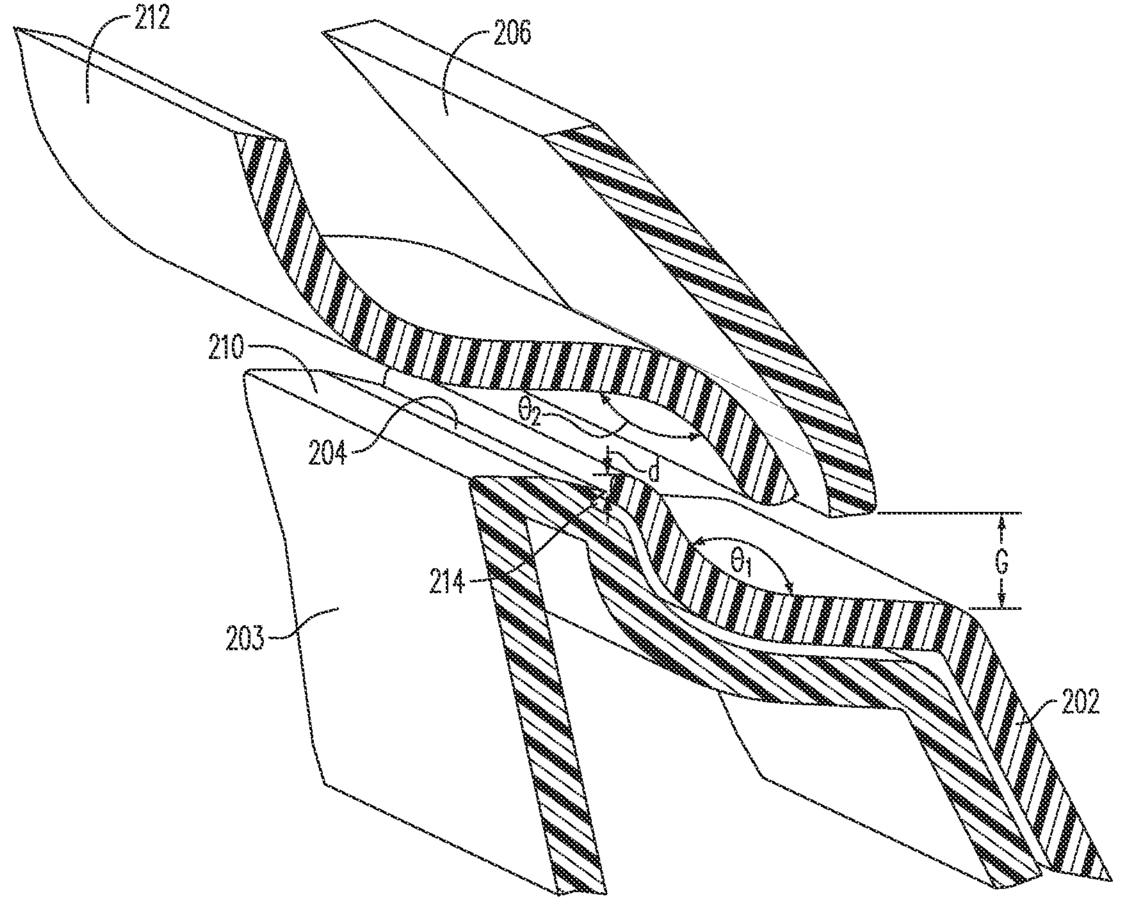
FIG. 4 is a perspective view of a garnish assembly according to an exemplary embodiment of the disclosure.

To address this concern caused by the flow of air through the gap G, an exemplary embodiment of the disclosure herein provides a D-pillar garnish or garnish panel with a chamfer, as shown generally in FIG. 3A by reference numeral 200. Garnish panel 200 includes an outer garnish body 202 and an inner garnish body 203 having a chamfer 204 extending rearward from an upper portion of the inner garnish body 203. Referring also to FIGS. 1B and 4, the garnish panel 200 defines an elongate member extending from an upper edge 220 proximate the roof panel of the vehicle 100' to a lower edge 222 generally corresponding in height to the lower edge of the rear quarter panel window 104. The garnish panel 200, including the outer garnish body 202 and the inner garnish body 203, can be molded from a plastic material, such as ABS or AEPDS or ASA, and the like, however one skilled in the art will understand that other materials and production methods could of course be used.

The outer garnish body 202 includes a main body portion 202*a* extending vertically along the exterior of the vehicle 100'. Extending from an upper edge of the main body portion 202*a* is a middle leg portion 202*b* defining a first curvature having an angle $\theta_1$ of approximately 95 to 155 degrees that directs air flow along the middle leg portion 202*b* from a primarily horizontal direction to a primarily vertical direction. A terminal end portion 202*c* extends from the end of the middle leg portion 202*b* and directs the airflow in a substantially horizontal direction.

The inner garnish body 203 includes a main body portion 203*a* extending vertically substantially parallel to the main body portion 202*a* of the outer garnish body 202*a*. Extending from an upper edge of the main body portion 203*a* is a first leg portion 203*b* also defining a third curvature having an angle $\theta_1$ of approximately 95 to 155 degrees that is complimentary to the first curvature of the middle leg portion 202*b* of the outer garnish body 202 such that the middle leg portion 202*b* nests within the first leg portion 203*b*. A second leg portion 203*c* extends on a first end from the upper portion of the first leg portion 202*b* and a terminal end portion 203*d* extends vertically downward from an opposing second end of the second leg portion 203*c*. Hence, the second leg portion 203*c* is a connecting section between the first leg portion 203*b* and the terminal end portion 203*d* and serves to space one from the other. The second leg portion 203*c* also defines a substantially horizontal uppermost surface 210 of the inner garnish body 203 and the chamfer 204 extending rearwardly from the surface 210.

Figures 2B, 3B:
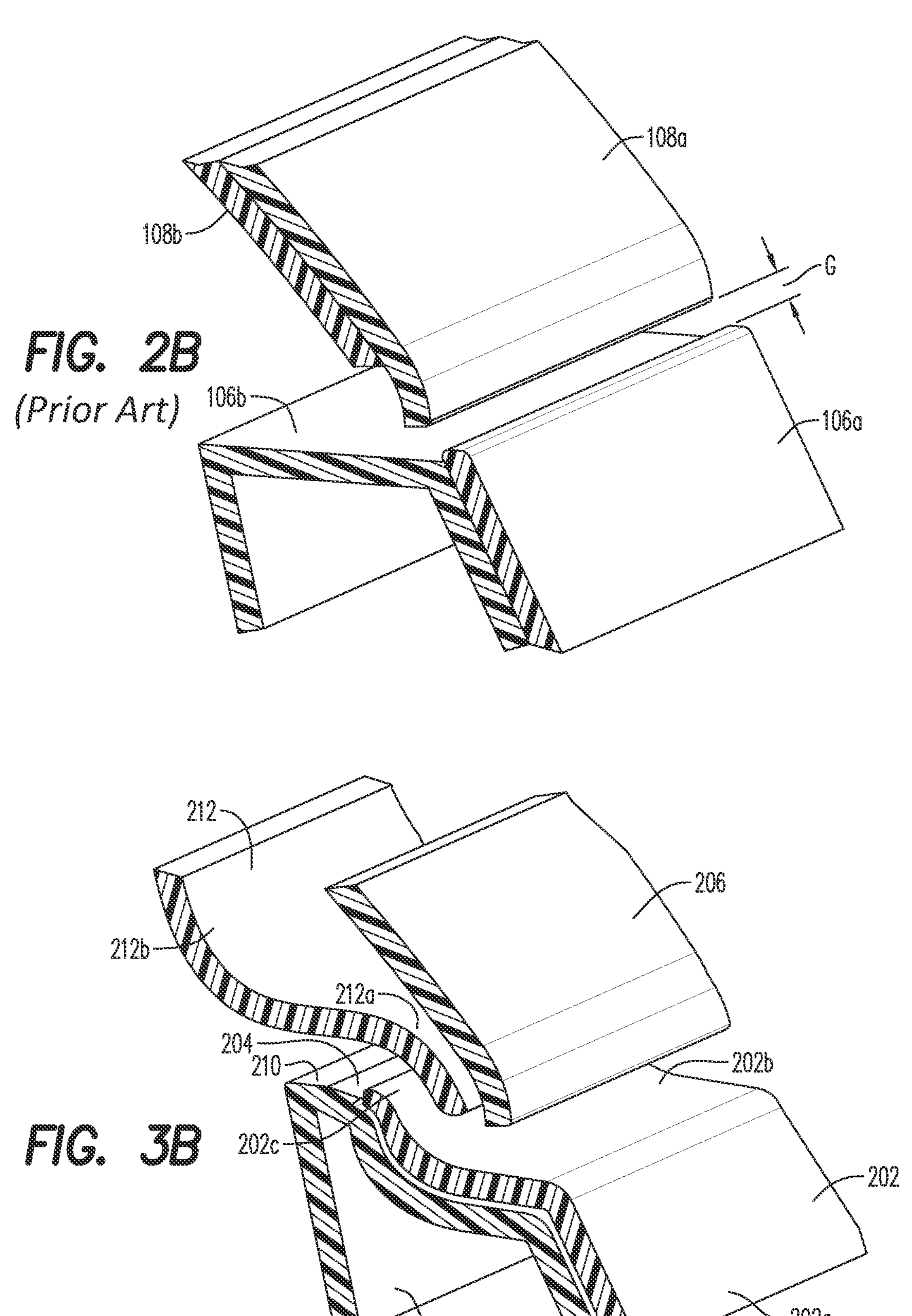
FIG. 2B is a perspective view of the prior art D-pillar garnish arrangement shown in FIG. 2A.
FIG. 3B is a perspective view of the garnish assembly shown in FIG. 3A.

As shown best in FIGS. 3B and 4, the chamfer 204 defines a declining surface as it extends rearward from the uppermost surface 210. Moreover, the terminal edge of the chamfer is spaced below the terminal end portion 202*c* of the outer garnish body 202 by a distance "d". More particularly, a terminal end of the chamfer 204 is offset from a top surface of the terminal end portion 202*c* of the outer garnish body 202 by a minimum height of approximately 1.5 mm. This offset spacing created by the chamfer 204 inhibits the outflow of air from behind the garnish panel 200 and thereby reduces the air turbulence leading to wind noise through the gap G. The chamfer 204 may also define an inner pocket or hook 214 at an upper end of the first leg portion 203*b* of the inner garnish body 203.

The rear spoiler 208 in the exemplary embodiment includes an outer rear spoiler garnish 206 and an inner rear spoiler garnish 212. The outer rear spoiler garnish 206 has substantially the same configuration as that known in the prior art in order to maintain the same aesthetic appeal of the vehicle. The inner rear spoiler garnish 212, however, includes a first leg portion 212*a* defining a second curvature having an angle $\theta_2$ of approximately 95 to 155 degrees. Extending from the first leg portion 212*a* is a second leg portion 212*b* extending substantially vertical upwards to the roof of the vehicle. The inner rear spoiler garnish 212*a* together with the garnish panel 200 define a curvy, labyrinth flow path having at least one curved section for the passage of air through the gap G.

In the exemplary embodiment disclosed herein, air behind the garnish panel 200 does not readily escape through the gap G between the rear spoiler garnish 208 and the garnish panel 200. Rather, the chamfer 204 and the terminal end portion 202*c* of the outer garnish body assist in impeding this passageway, causing air to flow through the labyrinth formed by outer garnish body 202 and inner rear spoiler garnish 212. The air is thus drawn along a tortuous pathway in order to escape from behind garnish panel 200. The air still flows from the higher pressure behind garnish panel 500 toward the lower pressure outside the vehicle. However, because the air must exit through this tortuous pathway of the labyrinth seal, the air escapes at slower speeds, reducing or eliminating the wind noise that is unpleasant for occupants of the vehicle.

Thus, as explained in detail above, garnish panel 200 and rear spoiler garnish 208 utilizes a combination of a convoluted flow path and a chamfer 204 in order to provide an improved garnish system that minimizes wind noise and thus reduces the disturbance to passengers within the vehicle. One skilled in the art will recognize, however, that these features could of course be used independently from one another to also achieve a reduction of the wind noise to some extent.

While various embodiments of the disclosure have been described, the description is intended to be exemplary, rather than limiting and it will be apparent to those of ordinary skill in the art that many more embodiments and implementations are possible that are within the scope of the disclosure. Accordingly, the disclosure is not to be restricted except in light of the attached claims and their equivalents. Also, various modifications and changes may be made within the scope of the attached claims.

We claim:

1. A vehicle comprising:

a vehicle body including a lower side, a rear quarter window and a rear spoiler garnish, the vehicle defining an inner passenger compartment;

a D-pillar garnish configured to be mounted on the vehicle body between the rear spoiler garnish and the lower side of the vehicle, the D-pillar garnish including:

an outer garnish body having a first predetermined curvature portion; and an inner garnish body;

wherein the rear spoiler garnish includes an outer rear spoiler garnish and an inner rear spoiler garnish, the inner rear spoiler garnish having a second predetermined curvature portion;

wherein a gap is defined between a rear edge of the outer garnish body and a lower edge of the rear spoiler garnish;

wherein the first predetermined curvature portion and the second predetermined curvature portion define a convoluted flow path through the gap.

2. The vehicle according to claim 1, wherein the inner garnish body includes a chamfer.

3. The vehicle according to claim 2, wherein the chamfer defines a sloped surface.

4. The vehicle according to claim 1, wherein the outer garnish body includes a main body portion, a middle leg portion and a terminal end portion.

5. The vehicle according to claim 4, wherein the inner garnish body includes a main body portion, a first leg portion, a second leg portion and a terminal end portion, the second leg portion including a chamfer defining a sloping surface adjacent the terminal end portion of the outer garnish body.

6. The vehicle according to claim 5, wherein a top surface of the chamfer is offset from a top surface of the terminal end portion of the outer garnish body by a distance of at least approximately 1.5 mm.

7. The vehicle according to claim 1, wherein the inner rear spoiler garnish includes a first leg portion and a second leg portion.

8. A garnish assembly for a vehicle, the vehicle including a lower side, a rear quarter panel window, and a rear hatch, and the vehicle defining an inner passenger compartment, the garnish assembly comprising: a rear spoiler garnish configured to be mounted on the vehicle above the rear hatch, the rear spoiler garnish including an outer rear spoiler garnish and an inner rear spoiler garnish; a D-pillar garnish configured to be mounted on the vehicle between the rear spoiler garnish and the lower side of the vehicle, the D-pillar garnish including an outer garnish body and an inner garnish body; wherein a gap is defined between the rear spoiler garnish and the D-pillar garnish; wherein the rear spoiler garnish and the D-pillar garnish define a flow path through the gap, wherein the flow path includes at least one curved section.

9. The garnish assembly according to claim 8, wherein the outer garnish body has a first predetermined curvature portion; and wherein the inner rear spoiler garnish has a second predetermined curvature portion; wherein the first predetermined curvature portion and the second predetermined curvature portion define the flow path through the gap.

10. The garnish assembly according to claim 9, wherein the outer garnish body includes a main body portion, a middle leg portion and a terminal end portion, the middle leg portion including the first predetermined curvature portion.

11. The garnish assembly according to claim 10, wherein the inner garnish body includes a main body portion, a first leg portion, a second leg portion and a terminal end portion, the first leg portion including a third predetermined curvature portion, the third predetermined curvature being complimentary to the first predetermined curvature of the middle leg portion such that middle leg portion of the outer garnish body nests within the first leg portion of the inner garnish body.

12. The garnish assembly according to claim 11, wherein the second leg portion of the inner garnish body includes an uppermost surface and a chamfer surface, the chamfer surface sloping rearward and downward toward the terminal end portion of the outer garnish body.

13. The garnish assembly according to claim 12, wherein a top of the chamfer surface is offset from a top surface of the terminal end portion of the outer garnish body by a height of at least approximately 1.5 mm.

14. The garnish assembly according to claim 13, wherein the chamfer surface defines an inner pocket at an upper end of the first leg portion of the inner garnish body.

* * * * *